W. Reid,
Feed Trough.
No. 87,970. Patented Mar. 16, 1869.
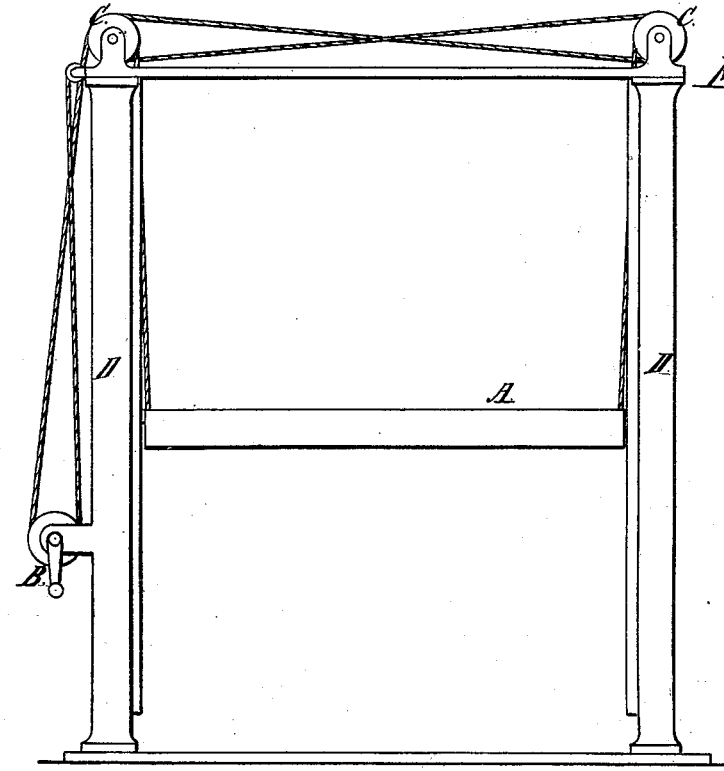
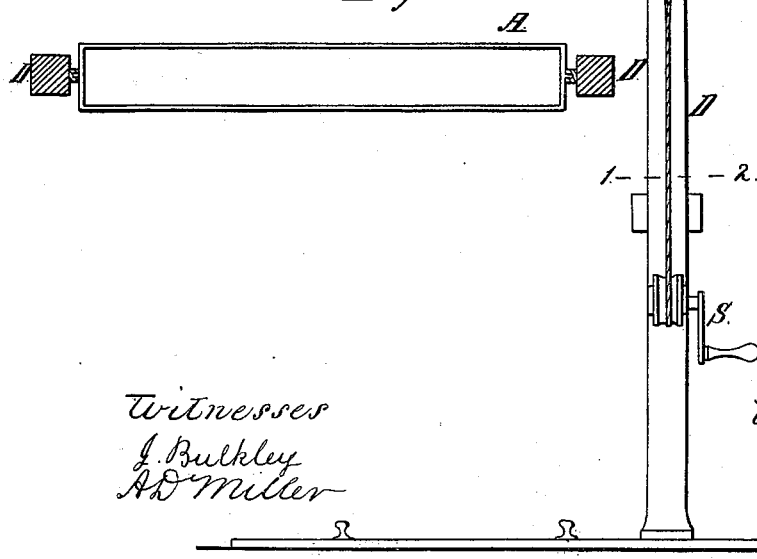
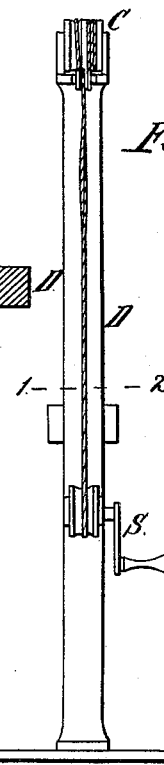
Witnesses
J. Bulkley
A. D. Miller
Inventor
W. Reid
By his atty
H. Howson

WILLIAM REID, OF GRANTON, SCOTLAND.

Letters Patent No. 87,970, dated March 16, 1869.

IMPROVEMENT IN DEVICE FOR FEEDING CATTLE DURING TRANSPORTATION.

The Schedule referred to in these Letters Patent and making part of the same.

*To all whom it may concern:*

Be it known that I, WILLIAM REID, of Granton, Mid-Lothian county, Scotland, have invented an Improvement in Feeding Animals during Transportation; and I do hereby declare the following to be a full, clear, and exact description of the same.

My invention consists in erecting, at railway-stations, sidings, or other suitable points on a line of railway, a set of supports, posts or pillars, to which are attached either hoisting-gear, or lowering-gear, or hooks, by means of which a trough or troughs may be raised to a sufficient height to enable the animals, when in the train, to drink or feed therefrom, the water or food being previously deposited in the trough for that purpose.

In order to enable others skilled in the art to make and use my invention, I will now proceed to describe its construction and operation, reference being had to the accompanying drawing, which forms a part of this specification, and in which—

Figure 1 is a side elevation of a device for carrying out my improvement;

Figure 2, an end view of the same; and

Figure 3, a sectional plan on the line 1–2, fig. 2.

A is a trough, of any suitable shape and dimensions, which is connected with a set of posts, or pillars, D D', so as to be raised or lowered by turning the winch-handle B, which actuates the pulleys C, the trough sliding vertically between the pillars D.

The trough may, however, be fixed, or raised, or lowered, in any other convenient way, and may be fitted with a hose, for supplying the water from the usual tanks at railway-stations.

When the cattle-cars are arrested at the station, the trough is elevated to such a position as to permit the cattle to have access to the same.

It is obvious that there are numerous mechanical devices which may be employed for the purpose of more effectually carrying this invention into practice. For instance, in lieu of supporting the troughs in such manner that they may be raised or lowered, to approach the mouths of the cattle, they may be arranged on a wall, or on pillars, in a fixed position, at a height that would enable the cattle in the train to drink or feed freely therefrom. Or they may be made capable of partly revolving in or on supports on the side of a trough, or may be constructed with sliding fronts, either of which arrangements enables the height of the outer line of the troughs, toward the line of rails, to be adjusted.

A tank may be fixed at one or both ends of a set of troughs, or of one continuous trough, by which the trough would be at once supplied with water on the approach of a train; or tanks may be fixed at both ends, and at intermediate places on a line of troughs.

It is also obvious that there are numerous methods under which troughs may be fixed, so as to be capable of horizontal or vertical motion.

In places where the troughs are fixed between two sets of rails, they may be made movable, or with double lips, so that a train on either pair of rails may be supplied by one and the same set of troughs, and under the latter modification, two trains can be supplied at once.

In fixing a set of troughs between two lines of rails, it may be found that the ordinary space is too narrow, in which case the troughs must either be raised or lowered, or made so that they can be shut by a parallel motion of the sides, the troughs to be suitably constructed with hinged joints.

Having now described the nature of my said invention, and several modifications for carrying the same into practical effect,

I claim as my invention, and desire to secure by Letters Patent—

The use of troughs, or vessels, for supplying food and water to animals when in railway-trucks or wagons, such troughs, or vessels being arranged at convenient places, separate and distinct from the trucks, either in a fixed position, or movable, to suit the different sizes of animals requiring to be fed or watered, substantially as described.

In testimony whereof, I have signed my name to this specification, in the presence of two subscribing witnesses.

WILLIAM REID.

Witnesses:
JAS. B. H. NISBET, *Leith.*
E. B. STERLING, *Leith.*